W. C. TUCKER.
Wagon-Hub.
No. 68,808. Patented Sept 10, 1867.
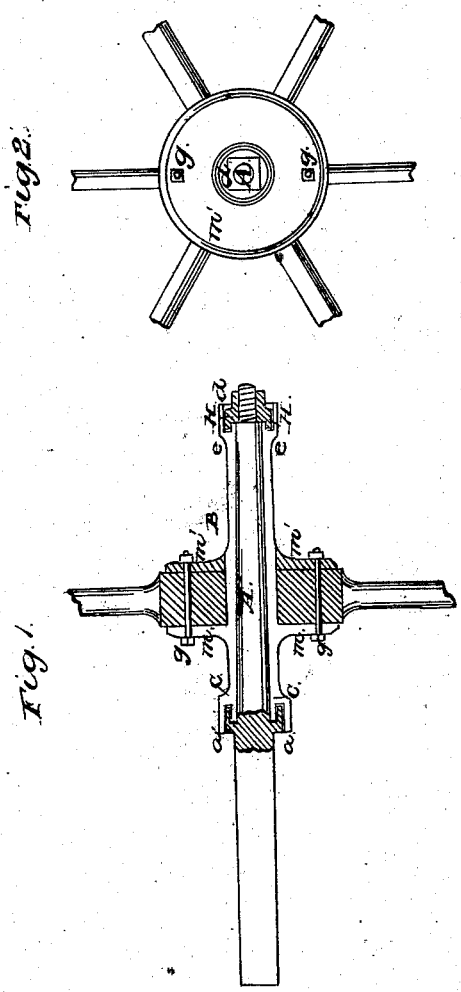
Witnesses.
Theo Tusche
Wm Trewin
Inventor.
W C Tucker
Per Munn & Co
Attorneys

UNITED STATES PATENT OFFICE

REISSUED

WELCOME C. TUCKER, OF RICHMOND SWITCH, RHODE ISLAND.

IMPROVEMENT IN WAGON-HUB.

Specification forming part of Letters Patent No. 68,808, dated September 10, 1867.

*To all whom it may concern:*

Be it known that I, WELCOME C. TUCKER, of Richmond Switch, in the county of Washington and State of Rhode Island, have invented a new and useful Improvement in Wagon-Hubs; and I do hereby declare that the following is a full, clear, and exact description thereof, which will enable others skilled in the art to make and use the same, reference being had to the accompanying drawings, forming part of this specification, in which—

Figure 1 is a central longitudinal section of my improved wagon-hub. Fig. 2 is an end view.

Similar letters of reference indicate like parts.

This invention relates to an improvement in the construction of wagon-hubs; and consists in connecting the hub with the axle by cup-flanges, and securing the hub on the axle with a cup-flanged nut, in such manner that the bearing of the axle shall be entirely closed at both ends to retain the oil and exclude dust and dirt.

My improvement also embraces an arrangement of adjustable collars for securing the wheel to the hub by a firm attachment.

A is the iron axle, and B is the hub, made of malleable cast-iron or other suitable metal, and bored to fit the turned axle perfectly true. A cup-flange, $a$, is turned on the axle at the back end of the hub, and on that end of the hub is turned a corresponding double cup-flange, $c$, that fits over and under the axle-flange $a$, as shown in Fig. 1. A similar plan of a double cup-flange, $e$, is made on the outer end of the hub B, and a nut, $d$, is formed with a cup-flange, $n$, to fit in the double flange $e$, as shown in the same drawing. By this arrangement of interlocking flanges at the front and rear of the hub the bearing of the axle is entirely closed, the oil will be kept clean, and the lubrication will be made perfect.

On the outside of the hub are two collars, $m$ $m'$, one of them, $m$, being cast on to be stationary, and the other, $m'$, made movable to fit over the hub, and thus inclose the wood-work of the wheel, which is made fast by screw-bolts $g$ $g$, passing through the collars $m$ $m'$, to bind them upon the wood, as shown clearly in the drawings.

Having thus described my invention, I claim as new and desire to secure by Letters Patent—

1. The cup-flanges $c$ $e$ on the back and front ends of the wagon-hub B, upon which are fitted the corresponding flanges $a$ on the axle A, and $n$ on the nut $d$, as herein shown and described.

2. In combination with the above, I claim the stationary collar $m$ and the adjustable collar $m'$ on the hub B, combined and arranged as and for the purpose specified.

WELCOME C. TUCKER.

Witnesses:
    M. FILLMORE CROSS,
    CHARLES CROSS.